Figure 1:
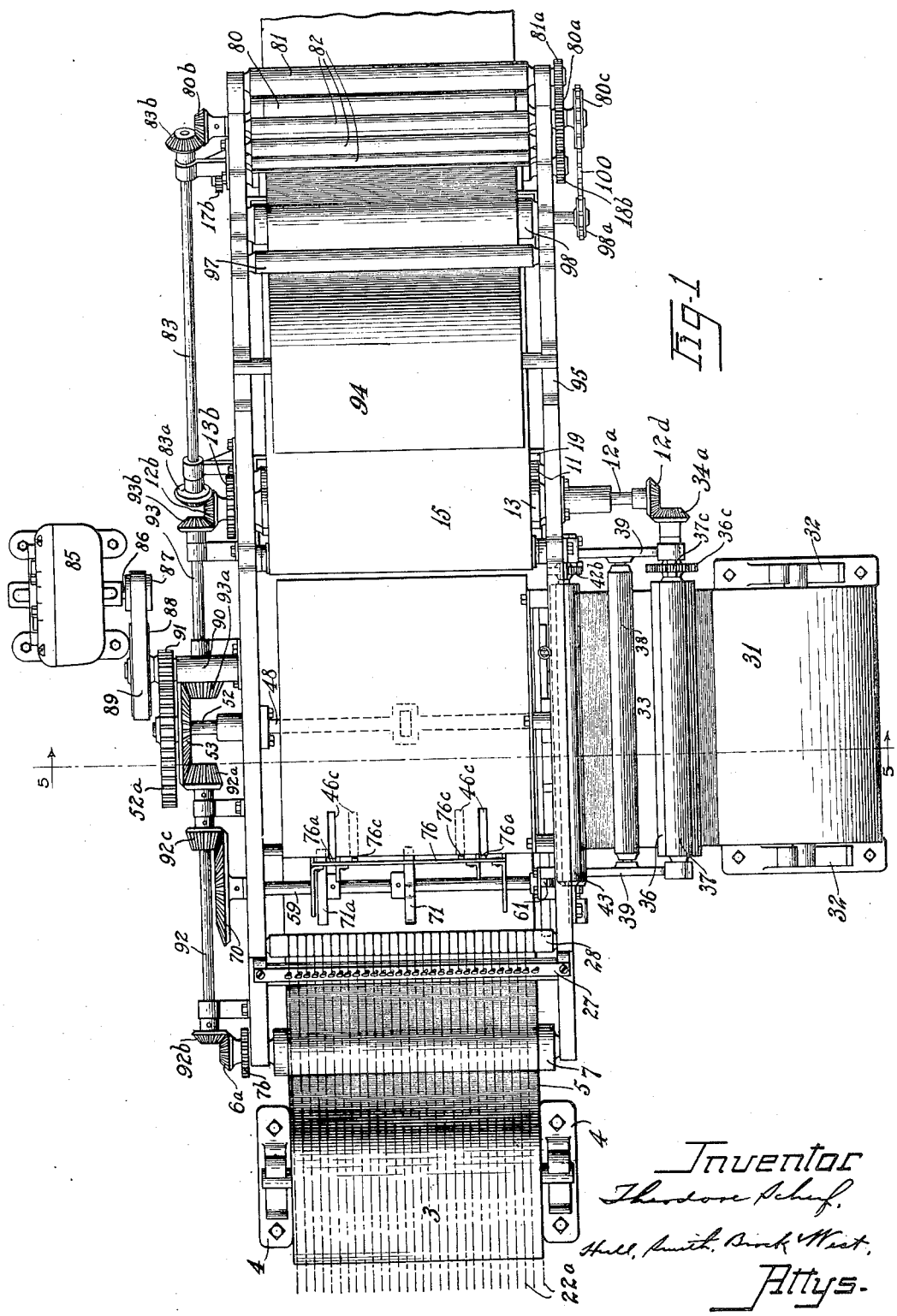

T. SCHERF.
MACHINE FOR MAKING MULTIPLY PAPER.
APPLICATION FILED FEB. 12, 1917.

1,299,237.

Patented Apr. 1, 1919.
7 SHEETS—SHEET 1.

Inventor
Theodore Scherf.
Hull, Smith, Birch & West,
Attys.

T. SCHERF.
MACHINE FOR MAKING MULTIPLY PAPER.
APPLICATION FILED FEB. 12, 1917.

1,299,237.

Patented Apr. 1, 1919.
7 SHEETS—SHEET 4.

Inventor
Theodore Scherf,
By Hall, Smith, Buck & West
Attys.

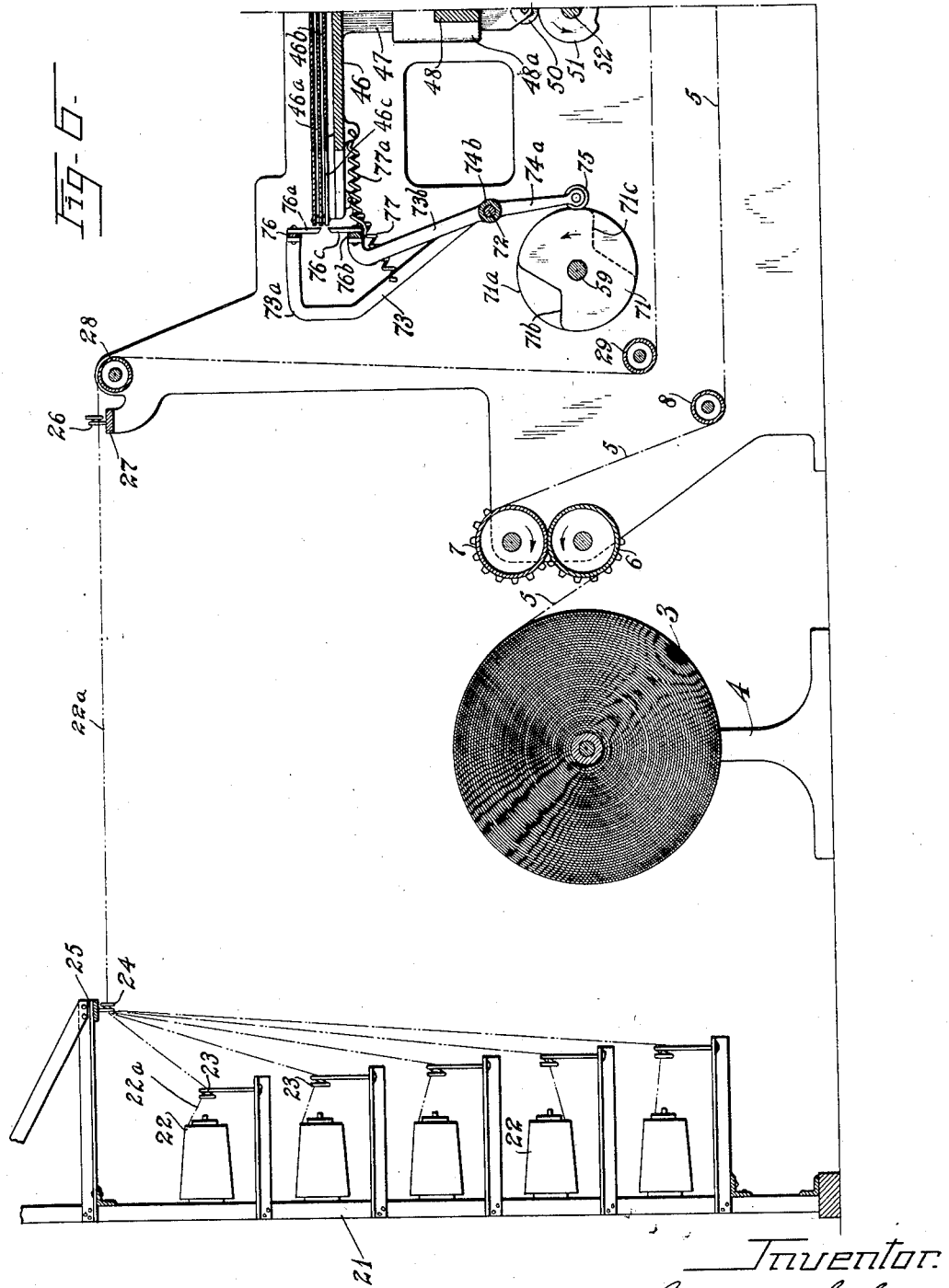

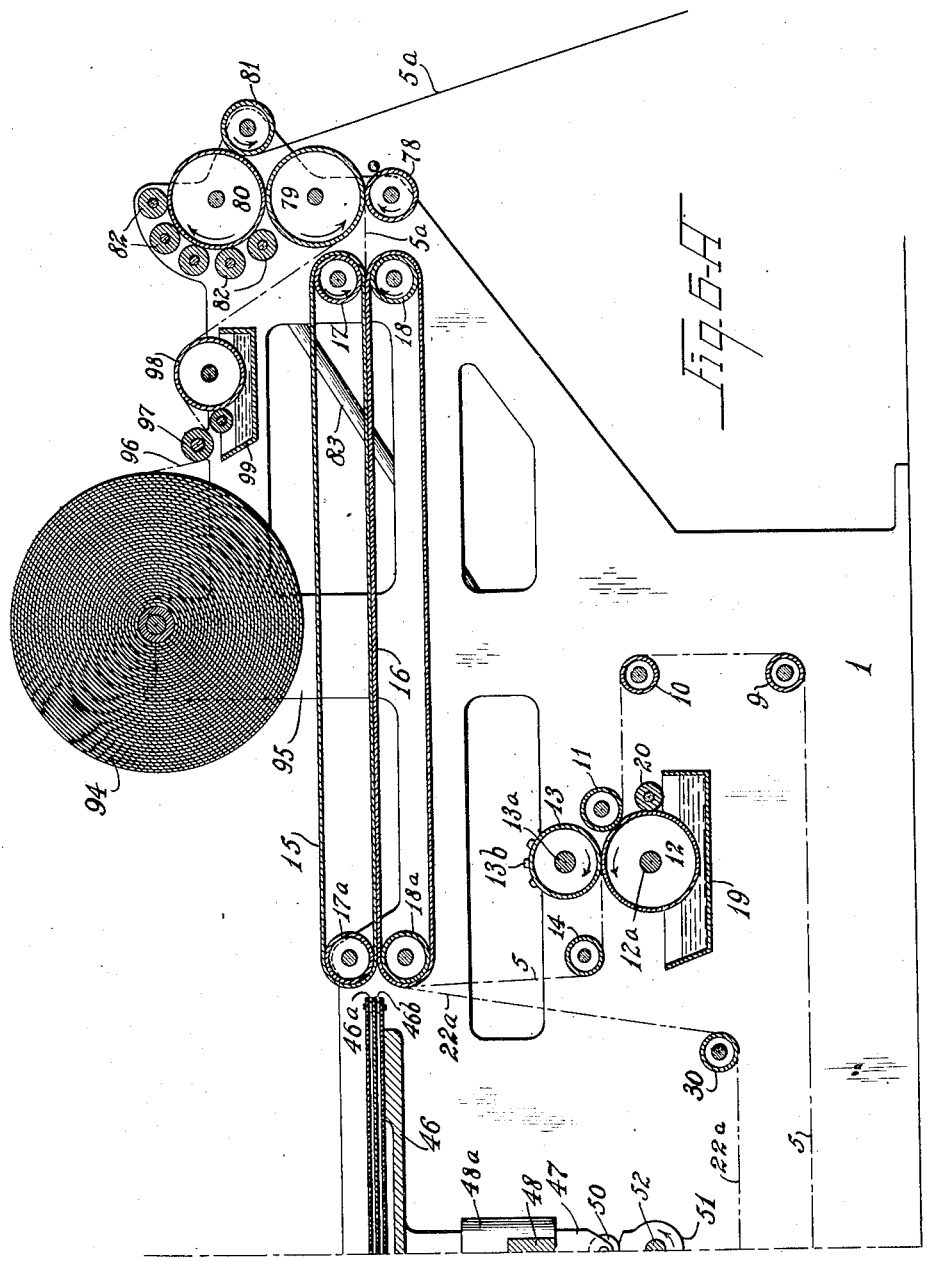

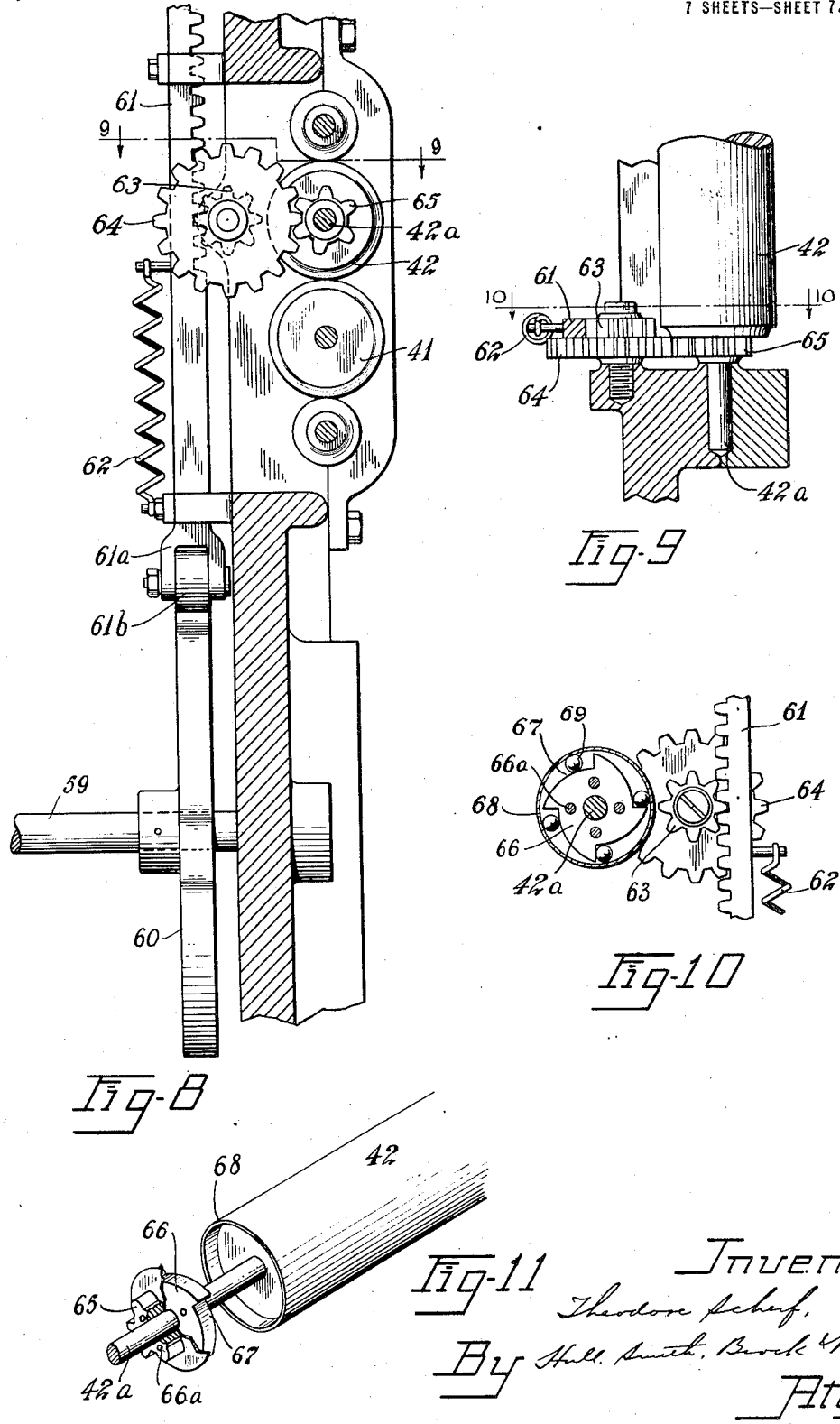

UNITED STATES PATENT OFFICE.

THEODORE SCHERF, OF CLEVELAND, OHIO, ASSIGNOR TO THE CLEVELAND-AKRON BAG COMPANY, OF CLEVELAND, OHIO, A CORPORATION OF OHIO.

MACHINE FOR MAKING MULTIPLY PAPER.

1,299,237.    Specification of Letters Patent.    Patented Apr. 1, 1919.

Application filed February 12, 1917. Serial No. 148,204.

*To all whom it may concern:*

Be it known that I, THEODORE SCHERF, a citizen of the United States, residing at Cleveland, in the county of Cuyahoga and State of Ohio, have invented a certain new and useful Improvement in Machines for Making Multiply Paper, of which the following is a full, clear, and exact description, reference being had to the accompanying drawings.

This invention relates generally to machines for manufacturing multi-ply paper, and more particularly to machines for manufacturing paper of this character having threads, cords, or similar reinforcing strips inserted between the plies thereof for the purpose of reinforcing the same.

One of the objects of the invention is to provide a machine of this character wherein the reinforced or webbed paper may be produced in a particularly efficient and novel manner. A further object of the invention is to provide a machine whereby a multi-ply paper will be produced by uniting the plies with their fibers extending at right angles to each other whereby the strength of the resultant sheet will be uniform in all directions. Paper produced in the manner described, especially when provided with reinforcing threads, is particularly valuable in the manufacture of bags for heavy, finely divided material such as plaster, it having been found impracticable heretofore, as a commercial proposition, to transport such material in paper bags because of the liability of the same to rupture.

While I am aware of the fact that it has been proposed to manufacture webbed or reinforced paper having crossed threads or reinforcing strips there between and to manufacture multi-ply paper with the fibers of the plies arranged at right angles to each other, no machine has heretofore been devised for manufacturing such paper. In the operation of my machine, as disclosed herein, a web of paper is fed preferably together with warp threads, to a pressure or uniting device where the warps are incorporated with the paper through adhesive material applied to the paper in transit, and a sheet of paper preferably having warps incorporated therewith, is fed in a direction transverse to the travel of the first web, is cut into lengths substantially equal to the width of the first web, and the severed sheets are automatically supplied to the said pressure device and thereby preliminarily united to the first web or sheet and its reinforcing warps. From this preliminary pressing device, the multi-ply sheet thus produced is conducted to final pressing means whereby the two plies are firmly and permanently united. When it is desired to provide each side of the multi-ply paper with a continuous surface, I apply to the sides of the transverse sheets opposite the aforesaid web a second web having an adhesive coating, conveniently uniting the second web to the paper by the final pressing means. The paper thus produced can be used for a number of purposes, a large field of usefulness being in the production of bags for the storage and shipment of various articles, such as the plaster referred to hereinbefore.

Figure 2:
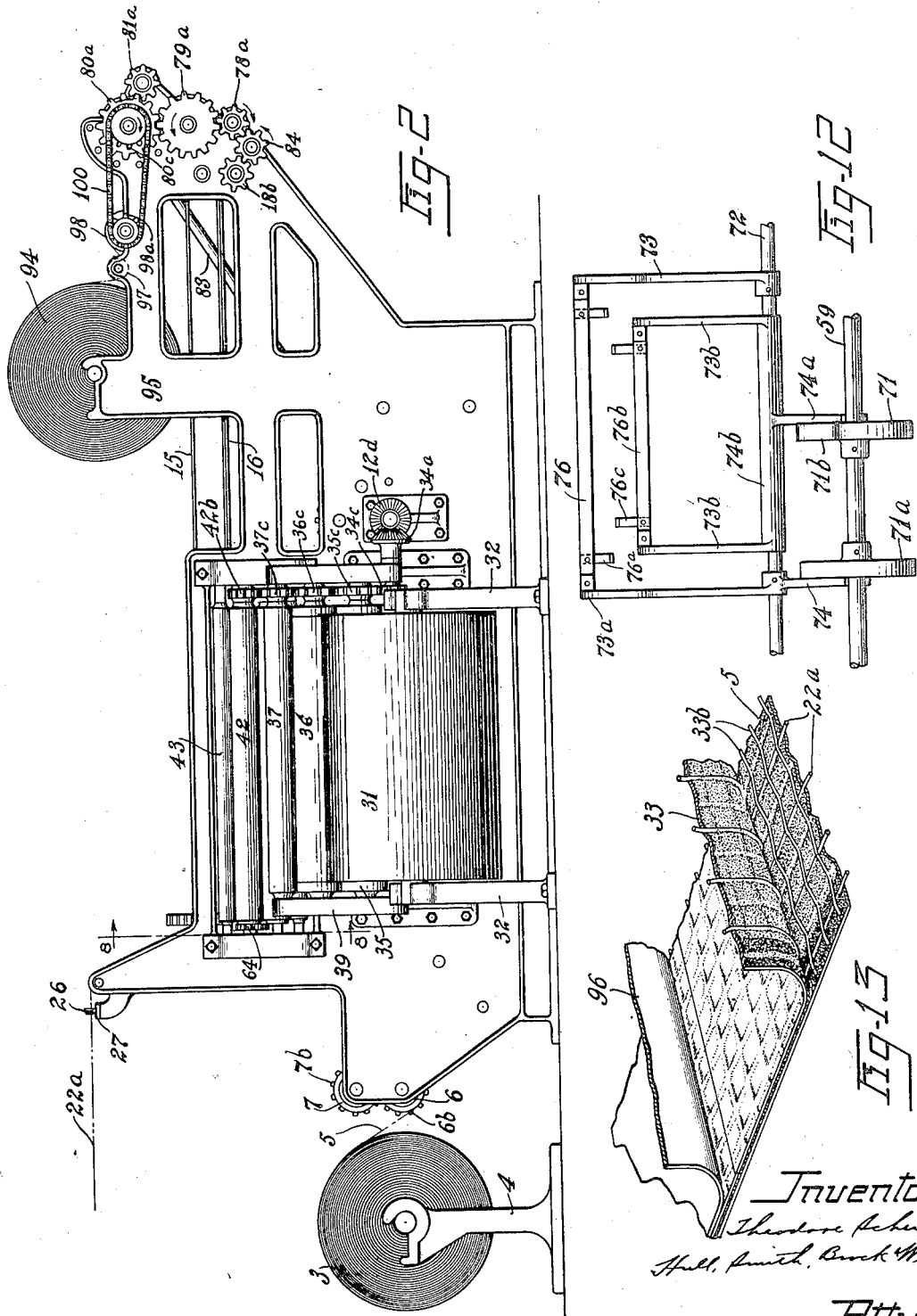
Figure 3:
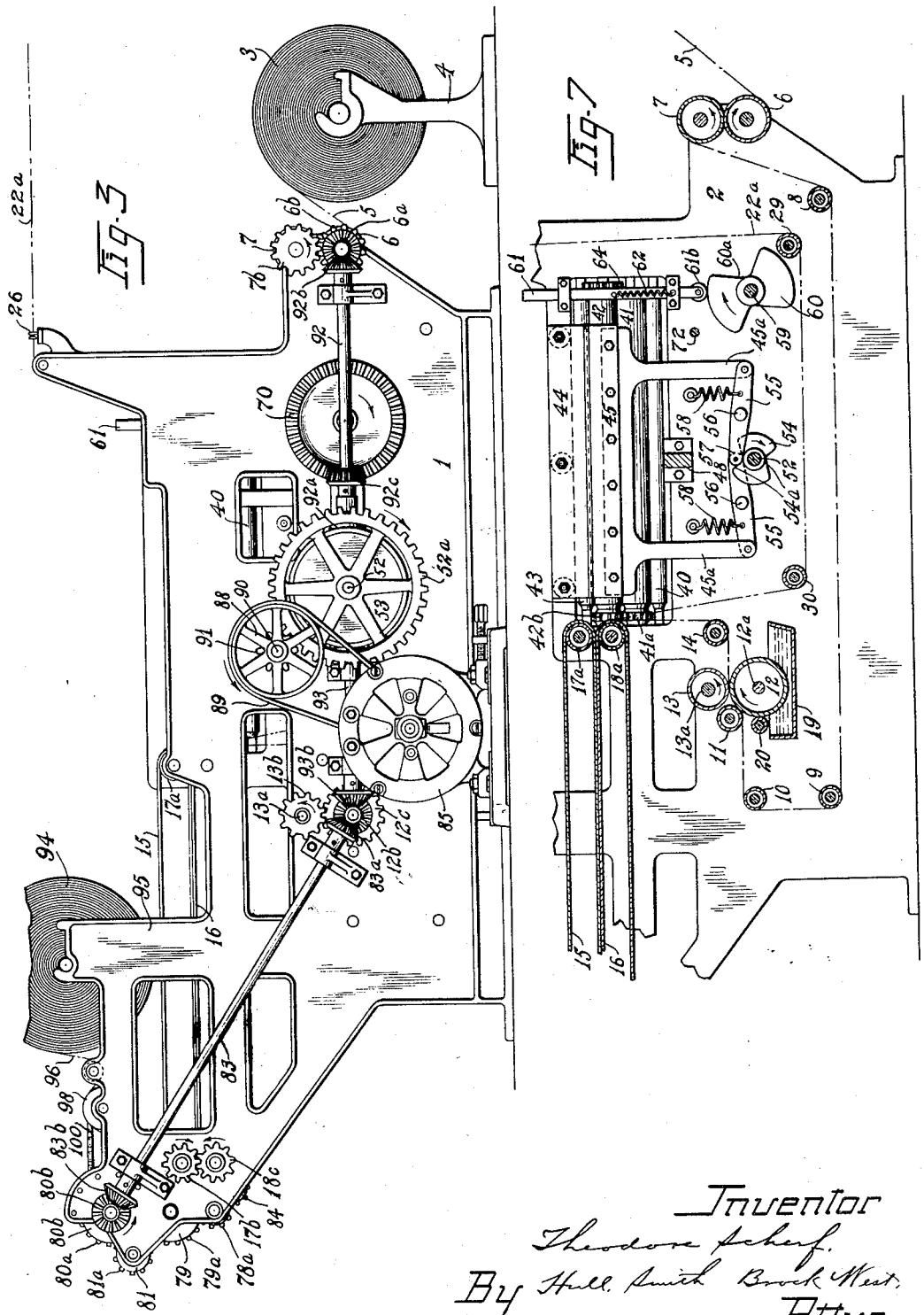
Figure 4:
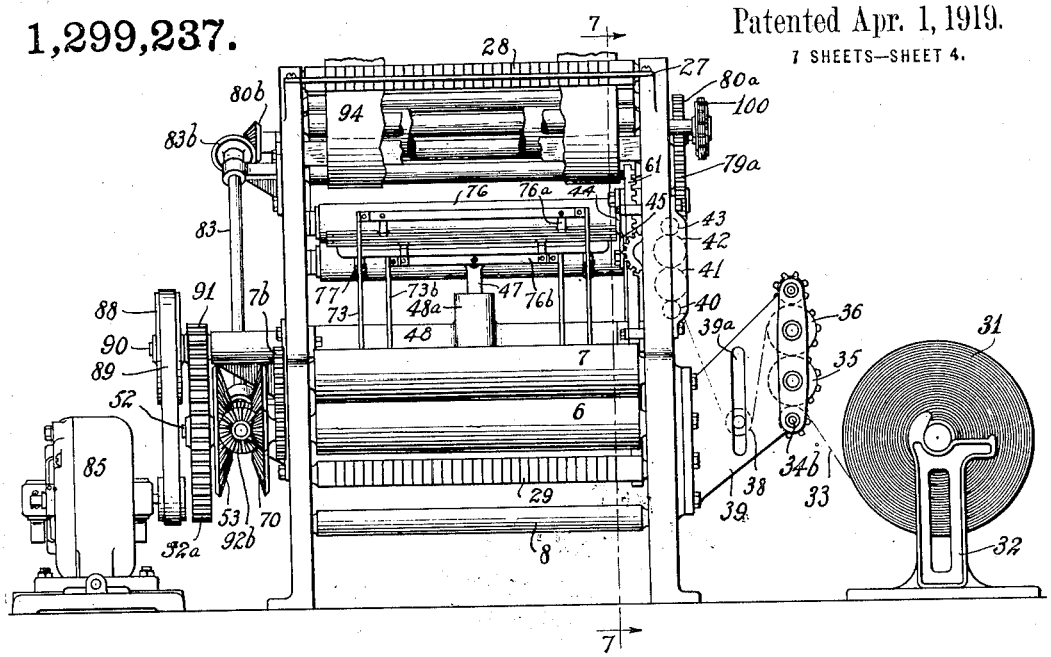
Figure 5:
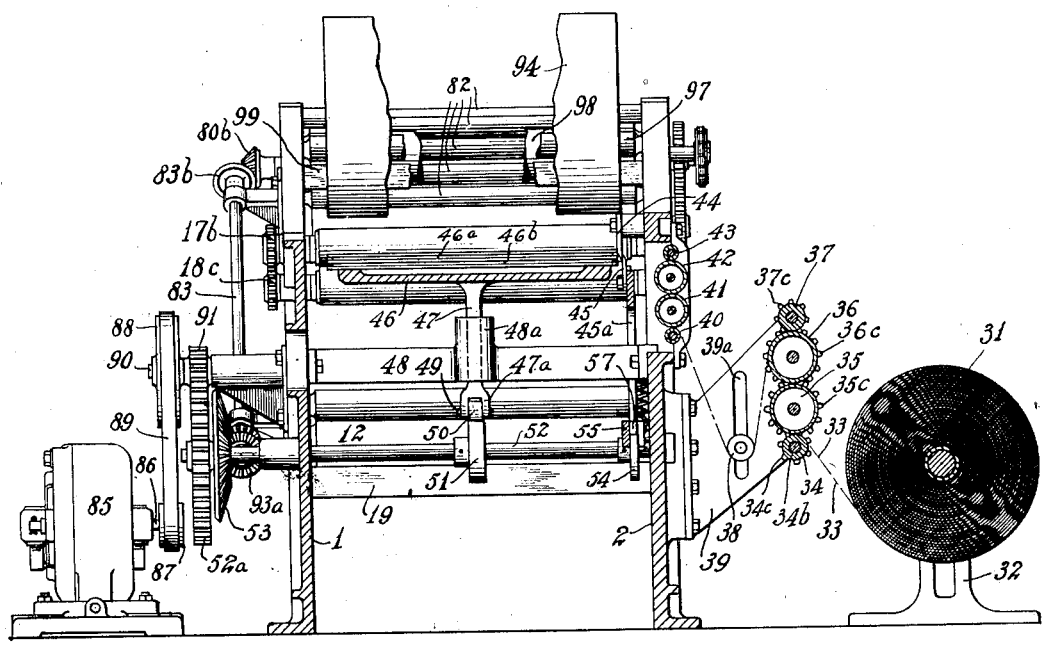

In the drawings forming part thereof and which illustrate the present preferred embodiment of my invention, Figure 1 represents a plan view of a machine of the character referred to; Fig. 2 a side elevation of said machine; Fig. 3 a similar view taken from the opposite side of the machine; Fig. 4 an elevation of the machine taken from the delivery end thereof; Fig. 5 a vertical sectional view corresponding to the line 5—5 of Fig. 1 and looking in the direction of the arrows; Figs. 6, 6ª jointly are enlarged longitudinal sectional views through the machine, certain parts being shown in elevation; Fig. 7 an enlarged sectional detail corresponding to the line 7—7 of Fig. 4 and looking in the direction of the arrows; Fig. 8 a sectional detail corresponding to the line 8—8 of Fig. 2 and looking in the direction of the arrows; Fig. 9 a sectional detail corresponding to the line 9—9 of Fig. 8 and looking in the direction of the arrows; Fig. 10 a sectional detail corresponding to the line 10—10 of Fig. 9 and looking in the direction of the arrows; Fig. 11 a detail in perspective of the clutch drive for one of the rollers shown in Figs. 8 to 10; Fig. 12 a detail in elevation of the mechanism for ejecting or forcing the severed sheets from the supporting means to the pressing or uniting means; and Fig. 13 a perspective view of the paper produced by the operation of the aforesaid machine.

Describing by reference characters the various parts illustrated in the drawings, 1 and 2 represent the sides of the frame work of the machine. This frame work supports the means for feeding and applying adhesive and warp threads to a traveling web of paper; means for intermittently feeding transversely of said web a sheet or ply of paper which may have warp threads incorporated therewith; means for severing the last mentioned sheet into individual sheets or plies of substantially the same length as the width of the first mentioned web or sheet, means for applying such severed sheets or webs successively with their adjacent edges in substantial contact to the first mentioned sheet or web; and means for uniting the first mentioned web or sheet and the smaller individual sheets cut from the second web; together with a drive shaft and connections for operating the various feeding, severing, applying, and uniting mechanisms.

*Web feeding and reinforcing means.*

At one end of the frame work a roll of paper 3 is rotatably supported on brackets 4 in the usual manner. The web 5 passes beneath a roller 6, between the same and a roller 7 (see Figs. 1, 2, 6 and 6ª) and over the latter roller to and beneath idle rollers 8 and 9 over an idle roller 10, beneath an ide roller 11, between rollers 12 and 13, and beneath an idle roller 14, whence it is led between the receiving ends of a pair of endless belts 15 and 16, said belts passing respectively around rollers 17, 17ª and 18, 18ª. The rollers 6 and 7 are provided with intermeshing gears 6ᵇ and 7ᵇ, respectively, and the gear 6ᵇ is driven from the main shaft by connections to be described hereinafter.

By the rollers 8 and 9, the web is conducted beneath certain reciprocating parts of the machinery and is guided by the rollers 10 and 11 between the rollers 12 and 13, the roller 12 being mounted so that its lower portion will rotate within a pan or tank 19 containing the paste or other adhesive material with which the web is to be coated, a roller 20 being mounted adjacent to the roller 12 for the purpose of maintaining upon the roller 12 an adhesive coating of any desired uniform thickness. The rollers 12 and 13 are mounted on shafts 12ª and 13ª, respectively, and are driven in the direction of the arrows (see Fig. 6ª) by mechanism to be described hereinafter.

At the rear of the roller 3 (see Figs. 6, 6ª) there is mounted a frame 21 supporting a suitable number of spools 22 containing the reinforcing threads. From these spools the threads 22ª are led through tensioning loops 23, through a transverse series of guiding and tensioning loops 24 on a frame 25, thence through suitable guide loops 26 on a transverse frame 27, over a fluted guide roll 28 and under similarly fluted rolls 29 and 30 whence they are led above the adhesive coated surface of the web 5, contacting with the same on the belt 16 at the rear side of the roller 18ª. It will be evident that, by passing between the adjacent branches of the belts 15 and 16, the warp threads 22ª will be incorporated with the web 5 and, through said belts and feed mechanism to be described hereinafter, with the reinforced sheets of paper supplied between the rollers 17ª and 18ª and the adjacent branches of the belts 15 and 16. As the various rollers through which the webbed or reinforced paper passes after leaving the belts 15 and 16 are common to both plies of the paper, a detailed description of such rollers and the driving means therefor will be described hereinafter.

*Feeding and applying means for transverse sheets.*

At one side of the machine is a roll 31 of paper, preferably having warp threads applied to one side thereof and united thereto by a suitable adhesive. This roll is mounted in brackets 32 of ordinary construction, and the paper indicated at 33, is led therefrom between rollers 34 and 35, around the roller 35 and between the same and the roller 36, around the roller 36 and between the same and the roller 37, thence under a roller 38 which is slidably supported in vertical slots 39ª in brackets 39, whereby the roller rests upon the paper and serves by gravity to take in the slack of the web under conditions to be described hereinafter. From the roller 38, the paper is conducted around and between the rollers 40, 41, 42 and 43 and is delivered by the last two rollers of such series, between a fixed knife blade 44 and a reciprocable knife blade 45, to one or the other of the two transversely extending compartments or spaces 46ª, 46ᵇ, of a reciprocating table 46. This table is provided with a central reciprocating standard 47 which extends through and is guided by a sleeve 48ª on a transverse frame 48 secured to the side frames 1 and 2. At is lower end the standard is forked, as shown at 47ª, the forks supporting a pin 49 having a roller 50 thereon. This roller coöperates with a cam 51 on a shaft 52 which is rotated by means of a bevel gear 53 and drive mechanism to be explained hereinafter. It will be observed (see Figs. 6, 6ª) that the cam 51 normally holds the table 46 in the position shown in such views throughout half the revolution of said cam and that, during the other half of such period of revolution, the table is dropped to bring the upper compartment or space 46ᵇ thereof into register with the receiving ends of the belts 15 and 16. This arrangement gives a relatively long interval of time for the insertion of the paper into its suitable compartment in the table, for its severing by the knives, and for its ejection from such compartment.

The shaft 52 is also provided with a cam 54 thereon which operates the knife 45. The connections whereby this is accomplished are shown more particularly in Figs. 4 and 7. The knife 45 is provided with a pair of depending legs 45ª each having one end of a lever 55 pivotally connected thereto, each of said levers being fulcrumed intermediate of its ends, as shown at 56, and the proximate ends of the said levers being connected and such connection being provided with a roller 57 which coöperates with the cam. This cam is provided with a relatively long dwell and a pair of relatively short recesses 54ª, and the lever arms are connected with springs 58 which, when the roller 57 registers with a recess, will throw the knife 45 upwardly and thus sever the paper sheet 33. As the cam rotates farther, the roller 57 will be moved upon the dwell of the cam and the knife blade 45 will be moved away from the blade 44 permitting the paper to be fed into said blades between the proper compartments of the table.

Through the connections to be described hereinafter, the feeding rolls 34—37 are operated continuously. However, because of the necessity for severing the web 33 into sheets of suitable length and for applying these sheets successively to the traveling web 5, the web 33 must be fed intermittently between the knives and to the table compartments. This result is accomplished by the driving connections between the rollers 40—43—see particularly Figs. 7 to 11 inclusive.

59 denotes a shaft which is driven from the main shaft, in a manner to be described hereinafter, and at four times the speed of said main shaft and which is provided with a cam 60 having two relatively long dwells and two recesess 60ª. Coöperating with this cam is a rack 61 (see Figs. 4 and 8-11) the lower end of the rack being forked, as indicated at 61ª and supporting a roller 61ᵇ resting on said cam and adapted to be held in engagement therewith by means of a spring 62. This rack meshes with a pinion 63 on a short shaft having rigid therewith a gear 64 meshing with a pinion 65 on the shaft 42ª on which the roller 42 is mounted. The pinion 65 may be loose upon the shaft 42ª and the said shaft may be rigidly connected with the roller 42. Rigid with the pinion 65 is the inner member 66 of a clutch, said inner member being conveniently connected to the pinion, as by means of pins 66ª. This clutch member projects within a recess in the adjacent end of the roller 42 and has at its outer surface several inclined surfaces 67 coöperating with the cylindrical cup 68 within the end of the shaft to form tapered guide ways for the balls 69. It will be evident that, by rotating the pinion 65 in one direction, a driving connection will be established between the said pinion and the roller and that, on a movement in the reverse direction or upon a cessation of the movement in such driving direction, the driving connection between the pinion and the roller 42 will be broken.

The roller 42 is the driving roller for the roller 41, the said rollers 41 and 42 being provided with intermeshing gears. It will be evident that, during the time that the rollers 40—43 are inoperative, the rollers 34—37 will be feeding the paper from the roll 31. The roller 38, resting upon the paper, will by its gravity, take in the slack of the sheet between the two series of rollers and will keep the paper under tension between such sets when the series 40—43 starts to feed the paper through the knives and to the table compartments, the throw of the cam 60 and the ratio of the gears 63, 64 and 65 being such that the rollers 40—43 will at each feeding movement advance the web the distance it has been advanced by the rollers 34—37 during the interval between such feeding movements of the rollers 40—43.

By reference to Figs. 1 and 6, the operation of the mechanism for feeding the severed sheets from the compartments or tables 46 to the receiving ends of the belts 15 and 16 may be understood. The shaft 59 is provided with a beveled gear 70, at one end thereof, driven from the main shaft through connections to be described hereinafter. On this shaft is a pair of cams 71, 71ª each having a long dwell and relatively short recess 71ᵇ, 71ᶜ respectively (see Figs. 6 and 12). Projecting upwardly from a rock shaft 72 are a pair of arms 73 and secured to said shaft is an arm 74ª provided with a roller 75 adapted to engage the cam. The arms 73 are bent toward the table 46, as indicated at 73ª, said arms being connected to a crossbar 76 provided with a pair of depending fingers 76ª which are adapted to enter slots 46ᶜ extending through the rear ends of the plates forming the upper compartment 46ª. A spring 77 connected to the arms 73 and to the table 46 maintains the roller 75 in engagement with the cam 71. Sleeved upon the shaft 72 is a hollow shaft 74ᵇ having a pair of arms 73ᵇ having connected to their upper ends a crossbar 76ᵇ having fingers 76ᶜ adapted to enter the slots 46ᶜ in the lower plate or support and thus to enter the compartment 46ᵇ. An arm 74ª depending from the hollow shaft 74ᵇ carries a roller similar to the roller 75 which by means of a spring 77ª, is maintained in engagement with the cam 71ª. It will be evident that, when the shaft 59 is revolved to permit the roller 75 to enter the recess 71ᵇ, the spring 77 will throw the arms 73 forwardly, enabling the fingers 76ª to kick a severed sheet from the compartment 46ª into the gap between the belts 15 and 16, the table then being in its elevated position. When the table is in its lowered position, the arms 73ᵇ will be operated by the spring 77ª and cam 71 to eject a sheet from the compartment 46ᵇ. The parts are so timed that this operation will take place at a period when the rollers 40—43 are inactive.

*Means for uniting the webbed plies of paper.*

The warp threads or strips 22ª are applied to the web 5 by means of the rollers 17, 17ª, 18, 18ª and the belts 15 and 16, and the said rollers and belts serve to preliminarily unite the transversely extending sheets delivered from the table 46 to said web, through the adhesive with which the web is coated, it being understood that the parts are so timed that, notwithstanding the fact the web 5 is being fed continuously and the transverse sheets are applied thereto intermittently, the said transverse sheets will be placed upon the web with the lateral edges of adjacent sheets in substantial contact, so as to form a practically unbroken reinforced multi-ply sheet by the uniting of the reinforced web with such reinforced sheets.

After passing between the belts 15 and 16, the plies of the compound sheet (indicated at 5ª) are permanently united by being passed between the rollers 78 and 79, around the roller 79 and between the same and the roller 80, and around the roller 80 and between the same and a final roller 81. On the opposite side of the roller 80 from the roller 81 there is a series of small idle rollers 82 which are adapted to press the paper against such side of the roller 80. If desired, either one of the rollers 79 and 80 may be heated, thereby to dry and set the paste or adhesive which has been applied to the web 5.

The rollers 78—81 are provided each with a gear (78ª—81ª) whereby the roller 80 serves to drive the remaining rollers, the roller 80 being driven by means of a bevel gear 80ᵇ (see Fig. 3) on the end of the roller shaft opposite the gear 80ª, said bevel gear meshing with a bevel gear 83ᵇ on one end of a shaft 83, said shaft having at its opposite end a bevel gear 83ª. The gear 78ª (see Fig. 2) meshes with a gear 84 which in turn meshes with the gear 18ᵇ on one end of the shaft of the roller 18, said shaft having at its opposite end a gear 18ᶜ meshing with a gear 17ᵇ on the shaft of the roller 17.

*Drive mechanism.*

Part of the drive mechanism has necessarily been referred to in the description of the preceding mechanism. I have shown an electric motor 85 as the source of power for operating the machine. The rotation of the motor shaft 86 is transmitted by means of pulleys 87, 88 and a belt 89 to the main shaft 90 having a pinion 91 thereon meshing with a gear 52ª on the shaft 52, which shaft reciprocates the table 46 through the cam 51 and the knife 45 through the cam 54. The shaft 52 is provided with a bevel gear 53 which drives a shaft 92 through a bevel gear 92ª, said shaft having at its opposite end a bevel pinion 92ᵇ meshing with a bevel gear 6ª on the shaft of the roller 6, said roller being provided with a gear 6ᵇ meshing with a gear 7ᵇ on the roller 7, the construction affording a means for feeding the paper from the roll 3. Intermediate of its ends, the shaft 92 is provided with a bevel pinion 92ᶜ meshing with a bevel gear 70 on the shaft 59, whereby the shaft 92 also serves to drive the latter shaft at the same speed as the shaft 52, thereby to intermittently operate the rollers 40—43 and to operate the levers which eject the transverse sheets from the compartments of the table 46 wherein they are temporarily supported.

The bevel gear 53 also drives a shaft 93 through a bevel pinion 93ª, said shaft having a bevel pinion 93ᵇ meshing with a bevel gear 12ᵇ on the shaft 12ª which carries the paste-applying roller 12, said roller being provided with a gear 12ᶜ meshing with a gear 13ᵇ on the roller shaft 13ª, whereby the rollers 12 and 13 will be driven in opposite directions. The shaft 83 is driven by the bevel gear 12ᵇ through the bevel pinion 83ª, and the shaft 83, as hereinbefore described, drives the rollers 17 and 18 and, through the belts 15 and 16, the rollers 17ª and 18ª.

The shaft 12ª extends across the machine (see Figs. 1, 2, 4 and 5) and is provided at the end opposite the gears 12ᵇ and 12ᶜ with a bevel gear 12ᵈ meshing with a bevel gear 34ª on the shaft 34ᵇ of the roller 34. This shaft is provided with a gear 34ᶜ by means of which and the gears 35ᶜ, 36ᶜ and 37ᶜ, the remaining rollers of the series are driven. The roller shaft 42ª is driven by the shaft 59 in the manner hereinbefore described. This shaft is provided with a gear 42ᵇ meshing with a like gear 41ª on the shaft of the roller 41, (see Fig. 7) whereby said rollers may be driven in reverse directions. As shown herein, the rollers 40 and 43 are idle rollers and serve to maintain the web 33 in operative relation to the rollers 41 and 42 respectively, and the roller 43 coöperates with the roller 42 to deliver said web between the knives 44, 45 and to the compartments 46ª, 46ᵇ.

With the parts constructed and arranged as described it is believed that the operation will be evident. The paper from the roll 3 is fed between the rollers 6 and 7, around the idle rollers 8, 9, 10 and 11, between the rollers 12 and 13, around the roller 18ª and between the belts 15 and 16. Warp threads, having been led from the spools through the various guides and around the grooved rollers, are inserted between the belts, thus insuring their feed, the feeding being facilitated by the adhesive material on the web 5. Meanwhile, paper from the roll 31 is fed by the series of rollers 34—37, beneath the gravity roller 38, to the series of rollers 40—43, being intermittently fed by the last mentioned series of rollers between the last mentioned series of rollers between the knives 44 and 45 into one of the compartments 46ª, 46ᵇ on the table 46. When this webbed paper has been fed across the appropriate compartment, the knife 45 is reciprocated to cut the paper, the movement of the feeding rollers 40—43 being suspended immediately after such insertion and during the operation of the parts 71—76ᶜ to thrust a severed sheet between the rollers 17ª, 18ª and on top of the adhesive coated web 5 and the warp threads thereon. The multi-ply paper 5ª thus formed is conducted between the belts and in operative relation to the rollers 78—82 inclusive, whereby the plies, together with their interposed reinforcing threads, are firmly united.

The purpose of providing two vertically spaced supports in the table 46 for the sheets severed from the web 33 is to insure sufficient time for the delivery of the web to such table, the severing of the web into sheets, and the delivery of the sheets to the belts 15, 16. While the table is in its elevated position with a sheet in the upper compartment, the web may be applied to the lower compartment and cut by the knives, and the sheet in the upper compartment will be ejected by the arms 73ª. Then, by a very slight movement (due to the cam) the web may be inserted into the upper supporting compartment and severed, the sheet in the lower compartment being ejected meanwhile by the arms 73ᵇ.

Because of the timing of the parts of the machine, the multi-ply paper thus produced will be practically continuous—that is to say, without any material breaks between the adjacent edges of the transverse sheets. The multi-ply paper produced by the operation of the machine as described thus far comprises a continuous reinforced web to which transversely extending reinforced sheets have been united. In some cases it is desired to have each side of the multi-ply paper provided with a continuous web. When such a product is desired, I may add to the machine hereinbefore described a roll of paper with means for feeding the web from such roll in contact with an adhesive-applying roller, delivering the coated web to the uniting rollers at the delivery ends of the belts and against the transverse sheets of the multi-ply paper supplied to such rollers by the belts. In Fig. 6ª, I have shown a roll of paper 94 supported by brackets 95 carried by the side frames. From this roll the web 96 is led beneath a roller 97, over a roller 98 which applies paste or other adhesive to the web from a tank 99. The adhesive coated web is then led beneath the roller 79 and is united with the transverse sheets of the multi-ply paper 5ª by such roller and the roller 78 and by the remaining rollers 80, 81 and 82.

The roller 98 may be conveniently driven from the shaft of the roller 80ª as by means of a chain 100 extending around a sprocket 80ᶜ on said shaft and a sprocket 98ª on the shaft of the first mentioned roller.

In Fig. 13, I have shown the multi-ply paper produced by my machine, including the second web. In this view, 5 denotes the web at one side of the sheets 33, 22ª the reinforcing threads for said web, 33ᵇ the reinforcing thread for the sheets, and 96 the web on the opposite sides of the sheets from the web 5.

For convenience of description, I have generally referred to the reinforcing material as "threads"; but it is to be understood that I do not intend to be limited thereby to any particular shape or kind of such reinforcing material. For instance, I may employ strips of fabric, or twine, made of any material and of any shape suitable for reinforcing or "webbing" the paper.

Having thus described my invention, what I claim is:—

1. In a machine of the character described, the combination, with pressing means, of a series of feed rollers, driving means for said rollers for feeding a web of paper to said pressing means, means for applying adhesive material to said web while in transit to said pressing means, a spool frame, means for supplying reinforcing threads from the spools on said frame to said pressing means, a table having spaced supports for sheets of paper and arranged in operative relation to said pressing means, means for reciprocating said table to bring the supports thereof alternately in operative relation to said pressing means, a paper roll, continuously operable feed rollers through which the paper from said roll is passed, a gravity roller under which the web from said roll is passed, additional feeding rollers through which the last mentioned paper web is passed and by which it is delivered to the supports on the table with its fibers at substantially right angles to the fibers of the first web, means for intermittently operating the last mentioned rollers, a knife interposed between the last mentioned rollers and the table, means for operating said knife, intermittently operable means associated with said table for feeding sheets consecutively from the supports thereof to the said pressing means, means additional to the pressing means for further uniting the sheets of paper to the web and the interposed reinforcing threads, and means for feeding an adhesive-coated web to the last mentioned name.

2. In a machine of the character described, the combination with pressing means, of a series of feed rollers, driving means for said rollers for feeding a web of paper to said pressing means, means for applying adhesive material to said web, means for supplying reinforcing threads to said pressing means, a table having spaced supports for sheets of paper and arranged in operative relation to said pressing means, means for reciprocating said table to bring the supports thereof alternately in operative relation to said pressing means, feed rollers for a second web of paper and serving to deliver the same to the supports on the table, a knife interposed between the last mentioned feed rollers and the table, means for intermittently operating said knife, means associated with said table for feeding sheets consecutively from the supports thereof to the said pressing means, and means additional to the pressing means for further uniting the sheets of paper to the web and the interposed reinforcing threads.

3. In a machine of the character described, the combination of a pair of belts, means for driving said belts in the same direction with their proximate branches in substantial contact, means for supplying a web of paper and reinforcing threads therefor between the said branches of said belts, means for applying a coating of adhesive material to the web in advance of said belts, a table having compartments and arranged in advance of said belts, means for reciprocating said table to bring the compartments thereof in operative relation to said belts, means operating intermittently to feed into each of said compartments in turn the forward end of a second web of paper, means for severing the said web after each such insertion whereby the paper thereof is cut into sheets, means for ejecting from each compartment the sheet that may be therein and for delivering it between said belts and on the opposite side of the reinforcing threads from the adhesive coated web, and additional means located beyond the delivery ends of said belts for further pressing and uniting the said web, sheets, and reinforcing threads.

4. In a machine of the character described, the combination of a pair of belts, means for driving said belts in the same direction with their proximate branches in substantial contact, means for supplying a web of paper and reinforcing threads therefor between the said branches of said belts, means for applying a coating of adhesive material to the web in advance of said belts, a table having spaced supports and arranged in advance of said belts, means for reciprocating said table so as to bring the supports thereof in operative relation to said belts, means for feeding to each support in turn the forward end of a second web of paper, means for severing the said web after each such insertion whereby the paper thereof is cut into sheets, and means for delivering from each support the sheet that may be thereon between said belts and on the opposite side of the reinforcing threads from the adhesive coated web.

5. In a machine of the character described the combination of means for feeding a web of paper, means for applying adhesive material thereto, means for feeding reinforcing threads for said web, a pair of belts, means for driving the said belts in the same direction with their proximate branches in substantial contact, means for delivering the said web and the reinforcing threads therefor between said belts, means for feeding at substantially right angles to said web a second web of paper, means for cutting the second web into sheets, and means for supplying said sheets successively between the proximate branches of said belts and in operative relation to the adhesive coated surface of the first mentioned web.

6. In a machine of the character described, the combination with pressing or uniting means, of means for feeding a web of paper, means for applying adhesive material thereto in transit, a spool supporting frame, means for feeding threads from the spools on said frame, means for applying such threads to the adhesive-coated web, means for feeding a second web of paper in a direction transverse to the direction of travel of the first mentioned web, means for cutting such second web into sheets, means for supplying said sheets successively to such pressing or uniting means whereby the said sheets will be initially united to the first mentioned sheet and the interposed threads, and additional means for pressing said sheets and the threads into adhesive relation to the first mentioned web.

7. In a machine of the character described, the combination, with pressing means, of means for feeding thereto a web of adhesive coated paper, a table at the receiving side of said pressing means, said table having spaced supports for sheets of paper, means for reciprocating said table to bring the said supports in operative relation to the pressing means, means for delivering sheets of paper to said supports, levers pivoted each intermediate of its ends at the side of said table which is opposite said pressing means, means carried by said levers and coöperating with the supports and movable toward and from the paper pressing means, a spring for moving each lever toward the said pressing means and a cam coöperating with each lever and serving to move the same in opposition to said spring.

8. In a machine of the character described, the combination, with pressing means, of means for feeding a web of paper thereto, means for applying adhesive material to said web, means for feeding a second web of paper in a direction transverse to the direction of travel of the first mentioned web, means for cutting the paper of such second web into sheets, and means for feeding such sheets and a second adhesive-coated web to such pressing means.

9. In a machine of the character described, the combination of means for feeding a web of paper, means for applying adhesive material thereto, means for feeding threads, a pair of rollers between which the adhesive-coated web and the threads are passed, means for feeding a second web transversely with respect to the first web, means for cutting the second web into sheets, means for inserting said sheets consecutively between said rollers and in contact with the threads and the adhesive-coated surface of the first web, and means for applying a second web to the multi-ply sheets thus produced.

10. In a machine of the character set forth, the combination, with uniting means, of means for supplying thereto a web of paper, a pair of supports adjacent to said uniting means, means for reciprocating said supports to bring the same successively into operative relation to said uniting means, means for feeding paper successively to said supports, means for cutting the paper thus fed into sheets, and means coöperating with each support to supply the sheet therefrom to said uniting means.

11. In a machine of the character set forth, the combination, with pressing means, of means for supplying thereto a web of paper, a pair of supports adjacent to said pressing means, means for reciprocating said supports to bring the same successively into operative relation to said pressing means, means for feeding paper successively to said supports, means for cutting the paper thus fed into sheets, means coöperating with each support to supply the sheet therefrom to said pressing means, and means in advance of said pressing means for interposing adhesive material between said web and sheets.

12. In a machine of the character described, the combination, with pressing means, of means for feeding a web of paper to said pressing means, a support for sheets of paper arranged adjacent to said pressing means, intermittently operating means for supplying paper to said support, means operating thereafter for cutting the last mentioned paper into sheets, and intermittently operating means for supplying sheets of paper from said support to the said pressing means whereby the said sheets will be delivered to said pressing means with their proximate edges in substantial contact.

13. In a machine of the character described, the combination, with pressing means, of means for feeding a web of paper to said pressing means, a support for sheets of paper arranged adjacent to said pressing means, intermittently operating means for supplying paper to said support, means operating thereafter for cutting the last mentioned paper into sheets, intermittently operating means for supplying sheets of paper from said support to the said pressing means whereby the said sheets will be delivered to said pressing means with their proximate edges in substantial contact, and means in advance of said pressing means for applying adhesive material between said web and said sheets.

14. In a machine of the character described, the combination, with pressing or uniting means, of means for feeding a web of paper thereto, means for feeding a second web of paper, a support in operative relation to said pressing or uniting means, means for cutting the second web into sheets the length whereof is substantially equal to the width of the first mentioned web, means operating intermittently to deliver the said sheets to said support, means operating intermittently to deliver said sheets from said support to said pressing or uniting means, and means for applying adhesive material between the said sheets and the first mentioned web.

15. In a machine of the character described, the combination, with pressing or uniting means, of means for delivering a web of paper to said pressing or uniting means, a support, means for delivering single sheets of paper successively to said support, means for delivering such sheets successively from said support to said pressing or uniting means, and means for applying adhesive material between the sheets and the said web.

16. In a machine of the character described, the combination, with pressing or uniting means, of means for feeding a web of paper thereto, a support, means for feeding a second web of paper transversely with respect to the first web, means for cutting the second web into sheets, means for depositing single sheets intermittently upon said support, intermittently operating means for delivering such sheets from said support in operative relation to said pressing or uniting means, and means for applying adhesive material between said sheets and the first mentioned web.

17. In a machine of the character described, the combination, with pressing or uniting means, of means for supplying a web of paper and reinforcing threads thereto, a support in operative relation to said pressing or uniting means, means for delivering sheets of paper to said support, means for delivering the sheets intermittently from said support to said pressing or uniting means, means for supplying a second web of paper to said pressing or uniting means, and means for applying adhesive material between said webs and said sheets.

18. In a machine of the character described, the combination, with pressing or uniting means, of means for feeding a web of paper to said pressing or uniting means, intermittently operating means for feeding a second web of paper transversely with respect to the first mentioned web, intermittently operating means for cutting the second web into sheets, intermittently operating means for delivering said sheets successively to said pressing or uniting means, and means for applying adhesive material between said sheets and the first mentioned web.

19. In a machine of the character described, the combination, with pressing or uniting means, of means for supplying thereto a web of paper and reinforcing threads, means for feeding a web of paper transversely with respect to the first mentioned web, means for cutting the second web into sheets, means for delivering said sheets successively to said pressing and uniting means, means for supplying a third web of paper to said pressing or uniting means, and means for applying adhesive material between said webs and sheets.

20. In a machine of the character described, the combination of a pair of belts, means for driving the said belts in the same direction with their proximate branches in substantial contact, means for delivering a web to said belts, means for delivering reinforcing threads to said belts, means for delivering sheets of paper successively to said belts, and means for applying adhesive material between the said sheets and the said web.

21. In a machine of the character described, the combination, with pressing or uniting means, of means for feeding a web of paper to said pressing or uniting means, means for feeding a second web of paper, means for applying adhesive material to one of said webs, means for cutting the paper of the second web into sheets the length whereof is substantially equal to the width of the first mentioned web, and means for depositing the said sheets successively upon the first mentioned web.

22. In a machine of the character described, the combination, with pressing or uniting means, of means for feeding a web of paper to said pressing or uniting means, a support in operative relation to said web, means for feeding a second web of paper, means for cutting the second web into sheets the length whereof is substantially equal to the width of the first web, means for delivering said sheets successively to said support, and means for delivering the sheets successively from said support to the first web.

23. In a machine of the character described, the combination with pressing or uniting means, of means for feeding a web of paper thereto, means for feeding a second web of paper, means for applying adhesive material to one of said webs, means for cutting the paper of the second web into sheets the length whereof is substantially equal to the width of the first web, and means for delivering said sheets successively to said pressing or uniting means.

24. In a machine of the character described, the combination, with pressing or uniting means, of means for delivering a paper web to said pressing or uniting means, means for delivering successively to said pressing or uniting means sheets of paper of a length substantially equal to the width of said web and the fibers whereof extend transversely of the fibers of the paper of said web, whereby said sheets will form with said web a substantially continuous double-ply paper, and means for applying adhesive material between said sheets and said web.

In testimony whereof, I hereunto affix my signature.

THEODORE SCHERF.

Copies of this patent may be obtained for five cents each, by addressing the "Commissioner of Patents, Washington, D. C."